US008208568B2

(12) United States Patent
Jeong

(10) Patent No.: US 8,208,568 B2
(45) Date of Patent: Jun. 26, 2012

(54) ESTIMATING CHANNEL IN ORTHOGONAL FREQUENCY DIVISION MULTIPLEXING COMMUNICATION SYSTEM

(75) Inventor: Ki Cheol Jeong, Seoul (KR)

(73) Assignee: Core Logic Inc., Seoul (KR)

( * ) Notice: Subject to any disclaimer, the term of this patent is extended or adjusted under 35 U.S.C. 154(b) by 701 days.

(21) Appl. No.: 12/360,805

(22) Filed: Jan. 27, 2009

(65) Prior Publication Data

US 2009/0190678 A1 Jul. 30, 2009

(30) Foreign Application Priority Data

Jan. 28, 2008 (KR) ........................ 10-2008-0008604

(51) Int. Cl.
*H04K 1/10* (2006.01)
(52) U.S. Cl. ........................................ 375/260; 375/147
(58) Field of Classification Search .................. 375/260, 375/147; 714/718; 370/208–210
See application file for complete search history.

(56) References Cited

U.S. PATENT DOCUMENTS

| 8,010,852 | B1 * | 8/2011 | Yang et al. | 714/718 |
|---|---|---|---|---|
| 2005/0141626 | A1 * | 6/2005 | Lee et al. | 375/260 |
| 2006/0098569 | A1 * | 5/2006 | Han et al. | 370/208 |
| 2006/0133529 | A1 * | 6/2006 | Lee et al. | 375/260 |
| 2007/0230601 | A1 * | 10/2007 | Yim et al. | 375/260 |

* cited by examiner

*Primary Examiner* — Emmanuel Bayard
(74) *Attorney, Agent, or Firm* — The Nath Law Group; Joshua B. Goldberg; Stanley N. Protigal

(57) ABSTRACT

Among others, techniques, systems and apparatus are described for estimating a channel in an orthogonal frequency division multiplexing (OFDM) communication system. A method of estimating a channel in an orthogonal frequency division multiplexing (OFDM) communication system includes sequentially receiving symbols. Each symbol includes pilots and data. The pilots included in each of first n symbols of the sequentially received symbols are placed in first areas of a memory component used for channel estimation. Data in second areas disposed between the first areas of the memory component are estimated. The pilots of at least one symbol after the nth symbol of the sequentially received symbols are placed in the first areas and the estimated data is updated in the second areas.

18 Claims, 10 Drawing Sheets

ESTIMATING CHANNEL IN ORTHOGONAL FREQUENCY DIVISION MULTIPLEXING COMMUNICATION SYSTEM

CROSS-REFERENCE TO RELATED PATENT APPLICATION

This application claims priority to Korean Patent Application No. 10-2008-0008604, filed on Jan. 28, 2008, in the Korean Intellectual Property Office, the disclosure of which is incorporated herein in its entirety by reference.

BACKGROUND OF THE INVENTION

The present application relates to estimating a channel in an apparatus for receiving an orthogonal frequency division multiplexing (OFDM) signal.

Digital high definition television (HDTV) broadcasting systems compress digital data of about 1 gigabits per second (Gbps) obtained from various HD image sources into data of 15~18 Megabits per second (Mbps) and transmit the digital data of several Mbps using a limited bandwidth channel of 6~8 megahertz (MHz). Because the HDTV broadcasting systems also transmit digital data of several tens of Mbps using the limited bandwidth channel of 6~8 MHz, high bandwidth efficiency is needed. Also, HDTV broadcasting systems adopt a terrestrial simultaneous broadcasting method that uses a very high frequency/ultra high frequency (VHF/UHF) channel allocated for conventional analog TV broadcasting and thus have to overcome interference on the same channel by an analog TV channel.

To increase transmission efficiency of each bandwidth and prevent interference, orthogonal frequency division multiplexing (OFDM) is selected as next generation HDTV terrestrial broadcasting from among a variety of possible digital modulations. OFDM converts a symbol sequence in serial form to symbols in parallel formed in a block unit, and multiplexes the parallel symbols at different subcarrier frequencies.

OFDM uses multiple closely-spaced orthogonal subcarriers to carry data. If a multiplication of two carriers results in 0, both carriers are orthogonal to each other. Orthogonal carrier waves are used to increase spectrum efficiency by overlapping carrier spectrums. To extract digital data from an OFDM modulated signal, receivers can estimate a channel.

SUMMARY OF THE INVENTION

Techniques, systems and apparatus for estimating a channel in an orthogonal frequency division multiplexing (OFDM) communication system are described. The techniques, systems and apparatus can be implemented to minimize or reduce the size of hardware used to estimate the channel while reducing the time taken to estimate the channel.

In one aspect, a method of estimating a channel in an orthogonal frequency division multiplexing (OFDM) communication system includes sequentially receiving symbols. Each symbol includes pilots and data. The pilots included in each of first n symbols of the sequentially received symbols are placed in first areas of a memory component used for channel estimation. Data in second areas disposed between the first areas of the memory component are estimated. The pilots of at least one symbol after the $n^{th}$ symbol the sequentially received symbols are placed in the first areas and the estimated data is updated in the second areas.

Implementations can optionally include one or more of the following features. A size of the memory component can correspond to a size of a single symbol. Estimating and updating the data in the second areas of the memory component can include performing channel interpolation. Performing channel interpolation can include at least one of linear interpolation, cubic interpolation, lattice interpolation, and interpolation using low pass filter. The pilots can be found in the same locations every n symbols of the sequentially received symbols. Estimating the data in the second areas can include estimating the data based on the pilots included in the first n symbols and placed in the first areas. Updating the estimated data of the second areas can include replacing the pilots in the first areas with pilots included in the at least one symbol after the nth symbol and updating the estimated data in the second areas based on the replacement pilots. Estimating the data in the second areas can include when an arbitrary symbol of the first through $n^{th}$ symbols is an $i^{th}$ symbol (where i is a natural number and $1 \leq i \leq n$), receiving the $i^{th}$ symbol and placing pilots included in the $i^{th}$ symbol in the first areas; and estimating the data in the second areas adjacent to the first areas based on the pilots of the $i^{th}$ symbol placed in the first areas and pilots of a symbol previous to the $i^{th}$ symbol. Estimating the data in the second areas can include detecting whether the $i^{th}$ symbol is a first symbol in the sequence of symbols after the pilots are placed in the first areas; and detecting whether the $i^{th}$ symbol is the $n^{th}$ symbol in the sequence of symbols after the data in the second areas is estimated. When detecting that the $i^{th}$ symbol is the first symbol, $(i+1)^{th}$ symbol can be received and pilots included in the $(i+1)^{th}$ symbol can be placed in the first areas. When detecting that the $i^{th}$ symbol is not the first symbol, the data in the second areas can be estimated. Wherein when detecting that the $i^{th}$ symbol is the $n^{th}$ symbol, the estimated data in the second areas can be updated. When detecting that the $i^{th}$ symbol is not the $n^{th}$ symbol, $(i+1)^{th}$ symbol can be received and pilots of the $(i+1)^{th}$ symbol can be placed in the first areas. When the pilots are repeatedly located every m−1 pieces of data of the received symbols, (where m is a natural number), and $z_i$ is a location of a first pilot included in the $i^{th}$ symbol, (where $z_i$ is an integer and $0 \leq z_i \leq m-1$), the first areas in which the pilots of the $i^{th}$ symbol are placed can be identified as areas $(m*x+z_i)$ of the memory (where x is 0 and a positive integer).

Implementations can optionally include one or more of the following features. Updating the estimated data of the second areas can include when an arbitrary symbol among the sequentially received symbols after $n^{th}$ symbol is an $n+j^{th}$ symbol (where j is a natural number), initializing j as 1; receiving the $n+j^{th}$ symbol; placing pilots included in the received $n+j^{th}$ symbol in the first areas; and updating the data in the second areas adjacent to the first areas based on the pilots included in the $n+j^{th}$ symbol and pilots included in a symbol previous to the $n+j^{th}$ symbol. After the data in the second areas is updated, compensating for the updated channel; and detecting whether the $n+j^{th}$ symbol is a final symbol. When detecting that the $n+j^{th}$ symbol is not the final symbol, receiving $n+(j+1)^{th}$ symbol, and when detecting that the $n+j^{th}$ symbol is the final symbol, ending channel estimation. The pilots of the $n+j^{th}$ symbol can be placed in the first areas where the pilots included in the $n^{th}$ symbol are placed when a remainder of dividing j by n is 0. The pilots of the $n+j^{th}$ symbol can be placed in the first areas where the pilots included in the $i^{th}$ symbol are placed when the remainder of dividing j by n is i. Estimating the data can include when the pilots are found in the same locations for every n symbols, each symbol including a pilot every m−1 pieces of data, and an arbitrary symbol is an $i^{th}$ symbol (where i is a natural number), initializing i as 1; receiving the $i^{th}$ symbol; calculating a remainder k of dividing i by n (where k is 0 and a positive integer and $0 \leq k \leq n-1$); placing pilots included in the $i^{th}$ symbol in the first areas of the memory component used for the channel estimation based on the calculated remainder k; and estimating the data in the second areas adjacent to the first areas in which the pilots of the $i^{th}$ symbol are placed. When i is greater than n, the data in the second areas can be updated including receiving the $i^{th}$ symbol; calculating the remainder k of dividing i by n; placing the pilots included in the $i^{th}$ symbol in the first areas of the memory component used for the channel estimation based on the calculated remainder k; and updating the data in the second areas adjacent to the first areas based on the pilots included in the $i^{th}$ symbol and pilots included in a symbol previous to the $i^{th}$ symbol.

In another aspect, an apparatus for estimating a channel in an OFDM communication system includes an estimation memory component to store data and pilots used to estimate the channel. The apparatus includes a controller in communication with the estimation memory component to place pilots included in each of received symbols in first areas of the estimation memory component, and control estimation and update of data in second areas adjacent to the first areas based on the pilots placed in the first areas.

Implementations can optionally include one or more of the following features. A size of the memory component can correspond to a size of a single symbol. The controller can include a symbol receiving unit to receive the symbols; a first area establishing unit to establish areas in which pilots included in the symbols are placed as the first areas of the estimation memory component; a second area establishing unit to establish areas adjacent to the first areas as the second areas of the estimation memory component; and a control signal transmitting unit to transmit a control signal to the estimation memory component based on outputs of the first area establishing unit and the second area establishing unit. The pilots can be found in the same locations for every n symbols of the received symbols, and the pilots for each symbol are located every m−1 pieces of data of each symbol. When an arbitrary symbol is an $i^{th}$ symbol, the first area establishing unit obtains k as a remainder of dividing i by n. When $z_i$ is a location of a first one of the pilots in the $i^{th}$ symbol, $z_i$ has a same value if the remainder is the same. The first area establishing unit can establish $(m^*x+z_i)$ areas of the estimation memory component as the first areas to place the pilots of the $i^{th}$ symbol. For the above, x is 0 and a positive integer, m is a natural number, i is a natural number, k is an integer and $0 \leq k \leq n-1$, and $z_i$ is 0 or a positive integer and $0 \leq z_i \leq m-1$. The apparatus can include a channel interpolating unit in communication with the estimation memory component to estimate and update the channel for the estimated and updated data in the second areas. The channel interpolating unit estimates the channel for the estimated data in the second areas based on the pilots included in the first through $n^{th}$ symbols and placed in the first areas and updates the channel for the updated data of the second areas based on pilots included in a symbol after the $n^{th}$ symbol and placed in the first areas. The apparatus includes an equalizing unit in communication with the channel interpolating unit to compensate for a channel of the updated data. The channel interpolation unit can be configured to estimate the channel using at least one of linear interpolation, cubic interpolation, lattice interpolation, and interpolation using low pass filter.

DETAILED DESCRIPTION OF THE INVENTION

Figure 1:
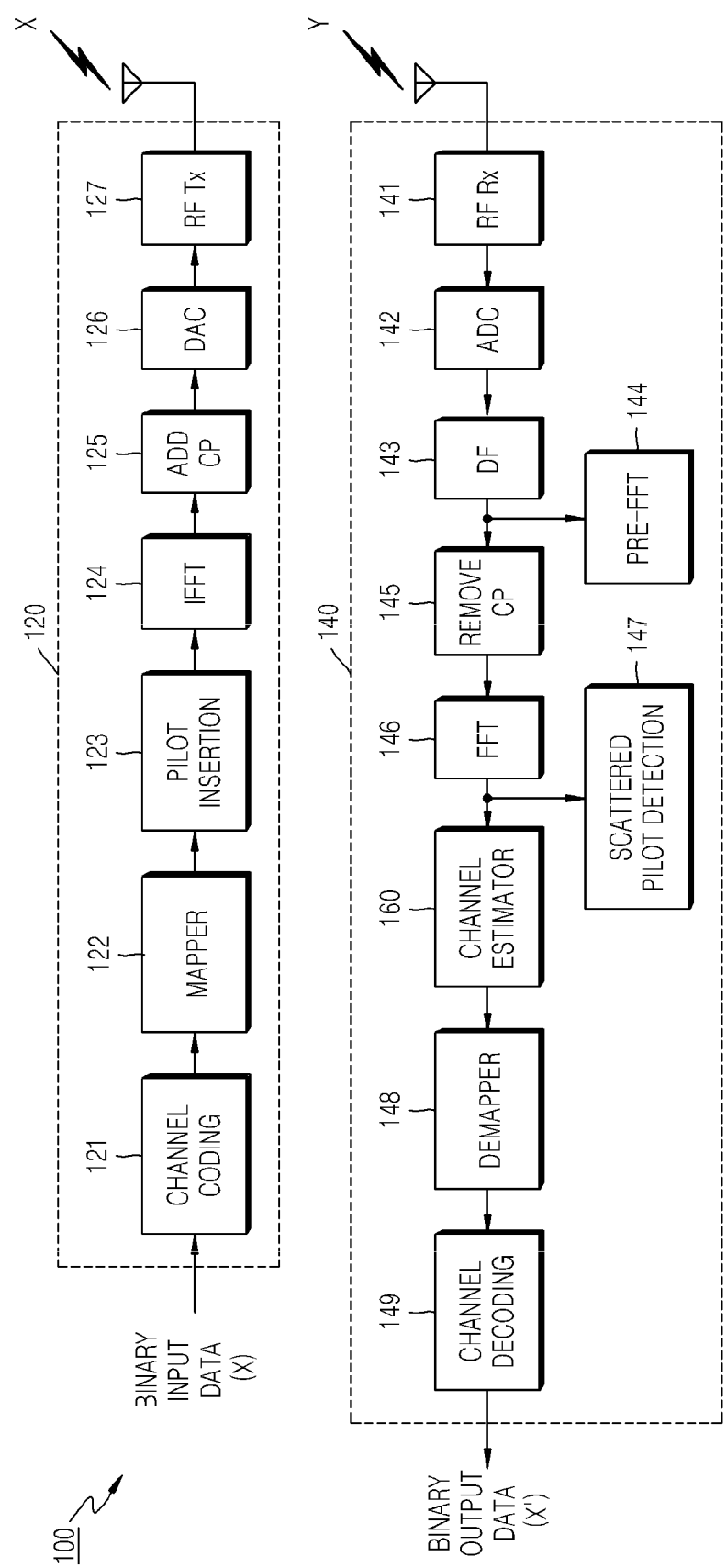
FIG. 1 is a block diagram of an orthogonal frequency division multiplexing (OFDM) communication system that includes a transmitter and a receiver.

FIG. 1 is a block diagram of an orthogonal frequency division multiplexing (OFDM) communication system 100 that includes a transmitter 120 and a receiver 140. The transmitter 120 of the OFDM communication system 100 includes a channel coding unit 121, a mapping unit 122, a pilot inserting unit 123, an inverse fast Fourier transform (IFFT) performing unit 124, a cyclic prefix (CP) adding unit 125, a digital-to-analog converter (DAC) unit 126, and a radio frequency (RF) transmitting unit 127. The receiver 140 of the OFDM communication system 100 includes an RF receiver 141, an analog-to-digital converter (ADC) unit 142, a frequency offset compensating unit 143 (e.g., a decimation filter), a CP removing unit 145, a fast Fourier transformation (FFT) performing unit 146, a channel estimating unit 160, a de-mapping unit 148, and a channel decoding unit 149.

The receiver 140 also includes a pre-FFT performing unit 144 disposed between the frequency offset compensating unit 143 and the CP removing unit 145 to obtain synchronization of symbols in the channel. The receiver 140 includes a scattered pilot detecting unit 147 that detects scattered pilots.

The channel coding unit 121 of the transmitter 120 receives binary input data X to be transmitted and performs channel coding of the received binary input data X. The mapping unit 122 receives the channel coded data from the channel coding unit 121 and modulates the received channel coded data by using a corresponding modulation method. The pilot inserting unit 123 receives the modulated data from the mapping unit 122 and inserts pilots in the received modulated data. The IFFT performing unit 124 receives the pilots inserted data from the pilot inserting unit 123 to perform IFFT on the pilots inserted data. The CP adding unit 125 receives the IFFT performed data and inserts a cyclic prefix in the received IFFT performed data. The DAC unit 126 receives the cyclic prefix inserted data from the CP adding unit 125 and performs digital-to-analog conversion on the received cyclic prefix inserted data. The RF transmitting unit 127 receives the analog data from the DAC unit 126 and outputs or transmits an analog signal X or the received binary input data X using a channel of a corresponding bandwidth in the RF transmitting unit 127.

The receiver 140 receives the signal X transmitted by the transmitter as a signal Y using the RF receiver 141. The relationship between the signal Y and the input data X can be expressed by equation 1 below, $$Y=H*X+n \qquad (1)$$

wherein, H denotes a channel, and n denotes noise.

The receiver 140 estimates the channel H and estimates the input data X from the received signal Y by using the estimated channel H. This process of estimating the channel and the input data is described further below.

The RF receiver 141 forwards the received signal Y to the ADC unit 142 to perform analog-to-digital conversion. The frequency offset compensating unit 143 receives the digital signal from the ADC unit 142 and compensates for a sampling frequency offset in the digital signal. The CP removing unit 145 receives the sampling frequency offset compensated signal from the frequency offset compensating unit (DF: Decimation Filter) 143 and removes a CP from the sampling frequency offset compensated signal. Also the sampling frequency offset compensated signal is forwarded to the pre-FFT performing unit 144 to obtain synchronization of symbols in the channel. The CP moved signal is forwarded to the FFT performing unit 146 to perform FFT on the CP removed signal.

The FFT performed signal is forwarded to the scatter pilot detecting unit 147 to detect pilots in each symbol of the channel. The FFT performed signal is also forwarded to the channel estimating unit 160 from the FFT performing unit 146 to estimate the channel H based on the detected pilots and obtain an estimated channel H'. When the estimated channel H' is obtained, the receiver 140 can obtain an estimated input data X' using the estimated channel H'. The receiver 140 extracts the estimated input data X' through de-mapping and channel decoding processes performed in the de-mapping unit 148 and the channel decoding unit 149 respectively.

The operation of estimating the input data X (to obtain estimated input data X') in the receiver 140 may be expressed by equation 2 below, $$X'=Y/H'=H*X/H'+n/H' \qquad (2)$$

wherein, X' denotes the estimated input data, and H' denotes the estimated channel.

The following describes techniques and apparatus for reducing the time needed to estimate the channel and reducing the size of hardware used to estimate the channel in the receiver 120 of the OFDM communication system 100.

Figure 2:
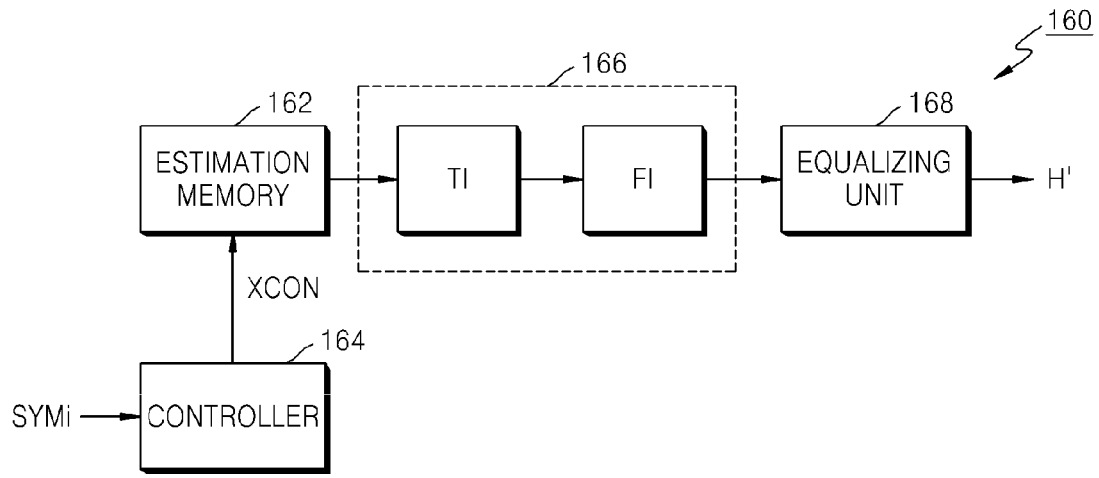
FIG. 2 is a block diagram of an apparatus for estimating a channel.

FIG. 2 is a block diagram of an example apparatus 160 for estimating a channel. The apparatus 160 for estimating the channel includes an estimation memory 162, a controller 164, a channel interpolating unit 166, and an equalizing unit 168.

The controller 164 controls storing pilots included in a received symbol to first areas of the estimation memory 162. In addition, the controller 164 controls estimating and updating of various pieces of data in second areas adjacent to the first areas of the estimation memory 162 based on pilots included in a received symbol and stored in the first areas. For example, when an $i^{th}$ symbol SYMi is received, the controller 164 places pilots included in the $i^{th}$ symbol SYMi in the first area of the estimation memory 162, and controls estimating and updating of the pieces of data of the second areas adjacent to the first areas based on the pilots of the $i^{th}$ symbol SYMi. In this regard, the $i^{th}$ symbol SYMi is a symbol randomly selected from among symbols in a parallel structure. The controller 164 is described further with reference to FIG. 3 below.

The channel interpolating unit 166 may include a unit TI for performing channel interpolation with regard to a time axis, t, and a unit FI for performing channel interpolation with regard to a frequency axis, f. The channel interpolation unit 166 estimates and updates a channel with regard to the pieces of data of the second areas in the estimation memory 162 based on the pilots stored in the first areas by using any one of the available channel interpolation methods. For example, the channel interpolation unit 166 can use one of linear interpolation, cubic interpolation, lattice interpolation, and interpolation using low pass filter, etc.

The equalizing unit 168 performs channel compensation on the updated channel. The equalizing unit 168 can apply any one of the available channel compensation techniques. For example, the equalizing unit 168 can use one of RS (Reed-Solomon) code, and Viterbi algorithm etc.

Figure 3:
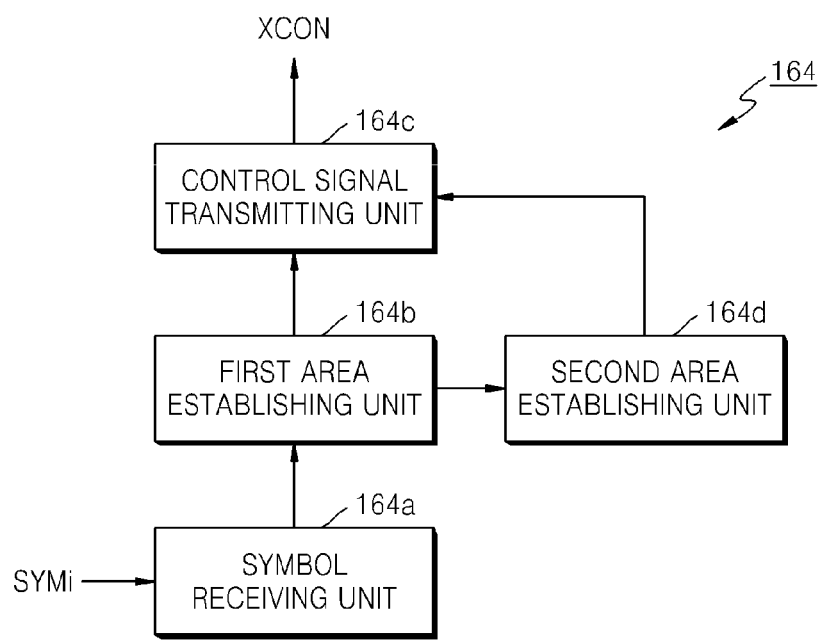
FIG. 3 is a block diagram of a controller shown in FIG. 2.

FIG. 3 is a block diagram of the controller 164 shown in FIG. 2. The controller 164 includes a symbol receiving unit 164a, a first area establishing unit 164b, a control signal transmitting unit 164c, and a second area establishing unit 164d.

The symbol receiving unit 164a receives a symbol (e.g., SYMi), and forwards the received symbol to the first area establishing unit 164b to establish first areas to be formed in the estimation memory 162 for storing pilots included in the received symbol. The received symbol is forwarded to the second area establishing unit 164d to establish areas adjacent to the first areas as the second areas. The control signal transmitting unit 164c receives outputs, including the established first and second areas, from the first area establishing unit 164b and second area establishing unit 164d respectively. The control signal transmitting unit 164c transmits a control signal, XCON, to the estimation memory 162 based on the received outputs of the first area establishing unit 164b and the second area establishing unit 164d.

The following describes an example channel estimation process performed by the channel estimating unit 160 with reference to flowcharts illustrated in FIGS. 5, 6, 9, and 11.

Figure 4:
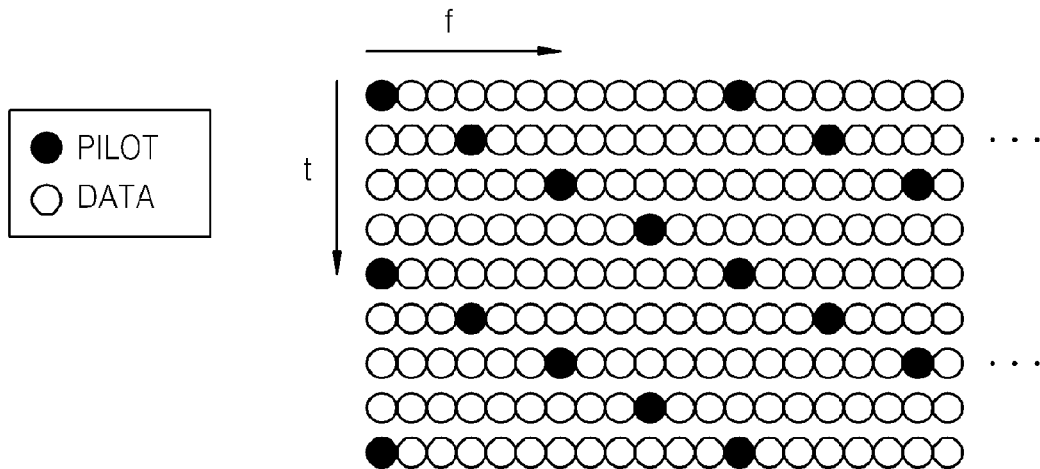
FIG. 4 is a structural view of OFDM symbols that use pilots.

FIG. 4 is a structural view of OFDM symbols that use pilots. The OFDM symbols may have a parallel structure. A single symbol can include pilots and data included in a single line along the frequency axis f. Each symbol may include scattered pilots (black circles). The OFDM symbols may include pilots every 11 pieces of data (white circles) along each line and have the same symbol structure every 4 symbols. The channel estimation method is described below based on the OFDM symbols having the above structure.

Figure 5:
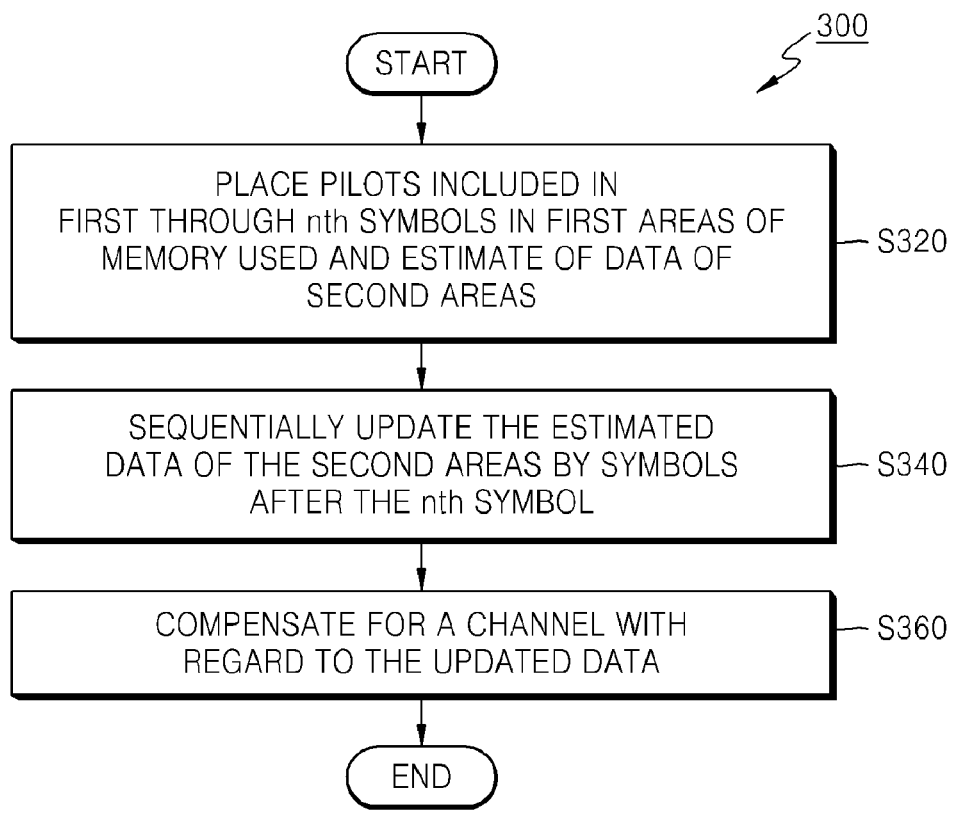
FIG. 5 is a flowchart illustrating a channel estimation method.

FIG. 5 is a flowchart illustrating an example channel estimation method 300. The channel estimation method 300 is used to place pilots included in the received first through $n^{th}$ symbols in first areas of a memory used for channel estimation and estimating pieces of data of second areas adjacent to the first areas (S320). Thereafter, the channel estimation method 300 is used to update the estimated pieces of data of the second areas based on sequentially received symbols after the $n^{th}$ symbol (S340). The channel estimation method 300 is used to compensate for a channel with regard to the updated pieces of data by using the equalizing unit 168 (S360).

In operation S320, when arbitrarily received symbols are sequentially the first symbol, the second symbol, . . . , the $n^{th}$ symbol, the $n+1^{st}$ symbol, and so on, the channel estimation method 300 can be used to place the pilots included in the first through $n^{th}$ symbols in the first areas of the memory used for channel estimation and estimate the pieces of data of the second areas adjacent to the first areas.

For the OFDM symbol structure shown in FIG. 4, the symbol repeating number, n, is set at 4, and the first through $n^{th}$ symbols are used in operation S320.

For n=4, the channel estimation method 300 can be used to place the pilots included in the first through fourth symbols in the first areas of the memory used for channel estimation and estimate the pieces of data of the second areas adjacent to the first areas. The pilots included in the first through fourth symbols are stored in predetermined areas of the memory used for channel estimation. The predetermined areas can include the first areas. For example, when the memory used for channel estimation stores a single symbol and is divided into various pieces of data or pilots, in view of the OFDM symbol structure, $1^{st}$, $4^{th}$, $7^{th}$, $10^{th}$, $13^{th}$, ... areas of the memory used for channel estimation include the first areas that store the pilots. If $2^{nd}$ and $3^{rd}$ areas between the $1^{st}$ and $4^{th}$ areas and $5^{th}$ and $6^{th}$ areas between the $4^{th}$ and $7^{th}$ areas, etc. of the memory used for channel estimation are the second areas in which the pieces of data are placed, a channel of the pieces of data of the second areas may be estimated by using the pilots of the first areas according to a channel interpolation method. A process of establishing the first and second areas and estimating the pieces of data of the second areas is described further with reference to FIGS. 6 through 8.

In operation 340, the estimated data of the second areas is updated by using the pilots included in the symbols after the $n^{th}$ symbol, i.e. the pilots from the $n+1^{st}$ symbol. For example, if n is 4 in the same manner as the OFDM symbol structure shown in FIG. 4, the estimated data of the second areas is updated by using the pilots included in the symbols after the $4^{th}$ symbol. In this example, the $1^{st}$~$4^{th}$ symbols are used for channel estimation, and the 5th, 6th ... and last symbol can be used for channel updating. Thus, pilots of the continuously received symbols are used to continuously update channel estimation of the data. Continuously updating the channel estimation of the data is described further with reference to FIGS. 9 and 10 below.

After operation S320 is performed, the equalizing unit 168 compensates for the channel with regard to the updated channel. This operation may be performed while operation 320 is performed.

Figure 6:
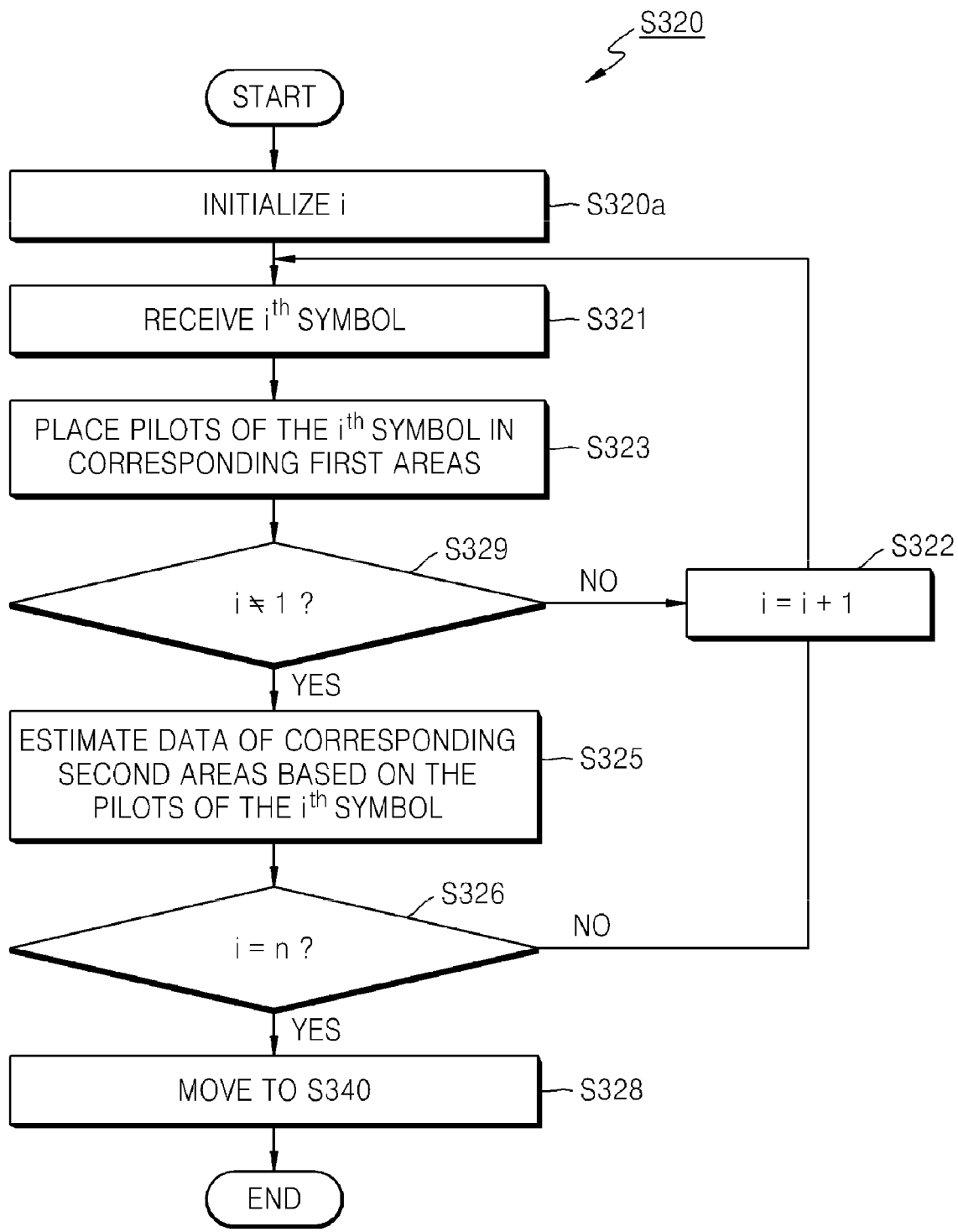
FIG. 6 is a detailed flowchart illustrating a data estimating operation shown in FIG. 5.

FIG. 6 is a detailed flowchart illustrating operation S320 shown in FIG. 5. For descriptive convenience, the detailed flowchart is described with reference back to FIGS. 2 and 3. An $i^{th}$ value is initialized as 1 (S320a) to indicate the beginning of the process. To place the pilots of the $1^{st}$ and $n^{th}$ symbols in the first areas and estimate the pieces of data of the second areas, the symbol receiving unit 164a of the controller 164 receives the $i^{th}$ symbol SYMi from among the $1^{st}$ and $n^{th}$ symbols (S321). The first area establishing unit 164b of the controller 164 establishes the first areas of the estimation memory 162 in which to place the pilots included in the $i^{th}$ symbol SYMi (S323).

When the pilots are repeatedly inserted into the $i^{th}$ symbol, SYMi, every m−1 (where m is a natural number) pieces of data, and a location of a first pilot among the pilots included in the $i^{th}$ symbol SYMi is $z_i$ (where $z_i$ is 0 or a positive integer and $0 \leq z_i \leq m-1$), the first area in which the pilots of the $i^{th}$ symbol SYMi are placed may be m*x (where x is 0 and a positive integer)+$z_i$ areas of the estimation memory 162. $z_i$ may be established so that the first area in which the pilots of the $i^{th}$ symbol SYMi are placed and the other adjacent first areas are spaced apart from each other by n−2 pieces of data.

For example, if the symbols of the present embodiment have the OFDM symbol structure shown in FIG. 4, n is 4 and m is 12. That is, the symbols of the present embodiment are repeated every 11 pieces of data and locations where a pilot is inserted every four symbols are the same. As shown in FIG. 4, the first symbol includes a first pilot in location 1 and the second symbol includes a first pilot in location 4. The third symbol includes a first pilot in location 7 and the fourth symbol includes a first pilot in location 10. As described above, the symbols after the fourth symbol have the same pilot locations corresponding to those of the first through fourth symbols (i.e., repeats every n symbols). Thus, the fifth symbol corresponds to the first symbol and the sixth symbol corresponds to the second symbol, etc. and pilot locations of the corresponding symbols are the same as each other.

If i is 1, where i denotes an order of the symbols, the location of the first pilot in the first symbol is 1, i.e. $z_i=1$, and m is 12 as mentioned above. Therefore, when x starts from 0, m*x+$z_1$ indicating the first areas are $1^{st}$, $13^{th}$, $25^{th}$, ... areas of the estimation memory 162.

If i is 2, the location of the first pilot in the first symbol is 4, i.e. $z_2=4$, and m is 12 as mentioned above. Therefore, when x starts from 0, m*x+$z_2$ indicating the first areas are $4^{th}$, $16^{th}$, $28^{th}$, ... areas of the estimation memory 162.

If i is 3 or 4, the first areas may be established by using the same method. Thereafter, the same pilot locations for when i is 1, 2, 3, and 4 are repeated.

Meanwhile, when k (where k is 0 or a positive integer and $0 \leq k \leq n-1$) is obtained by dividing i by n, the first areas may be established based on k. When n is 4, k may be one of 0 through 3, and the first areas may be established based on the values 0 through 3.

When the first areas are established based on k, the first area establishing unit 164b establishes a predetermined area as the first areas based on k. Thus, when k is 0, the first areas are $10^{th}$, $22^{nd}$, ... areas of the estimation memory 162 where each stores pilots of a symbol having the same structure as the fourth symbol when i is 4. When k is 1, the first areas are 1st, 13th, 25th, ... areas of the estimation memory 162 where each stores pilots of a symbol having the same structure as the first symbol when i is 1.

Figure 11A:
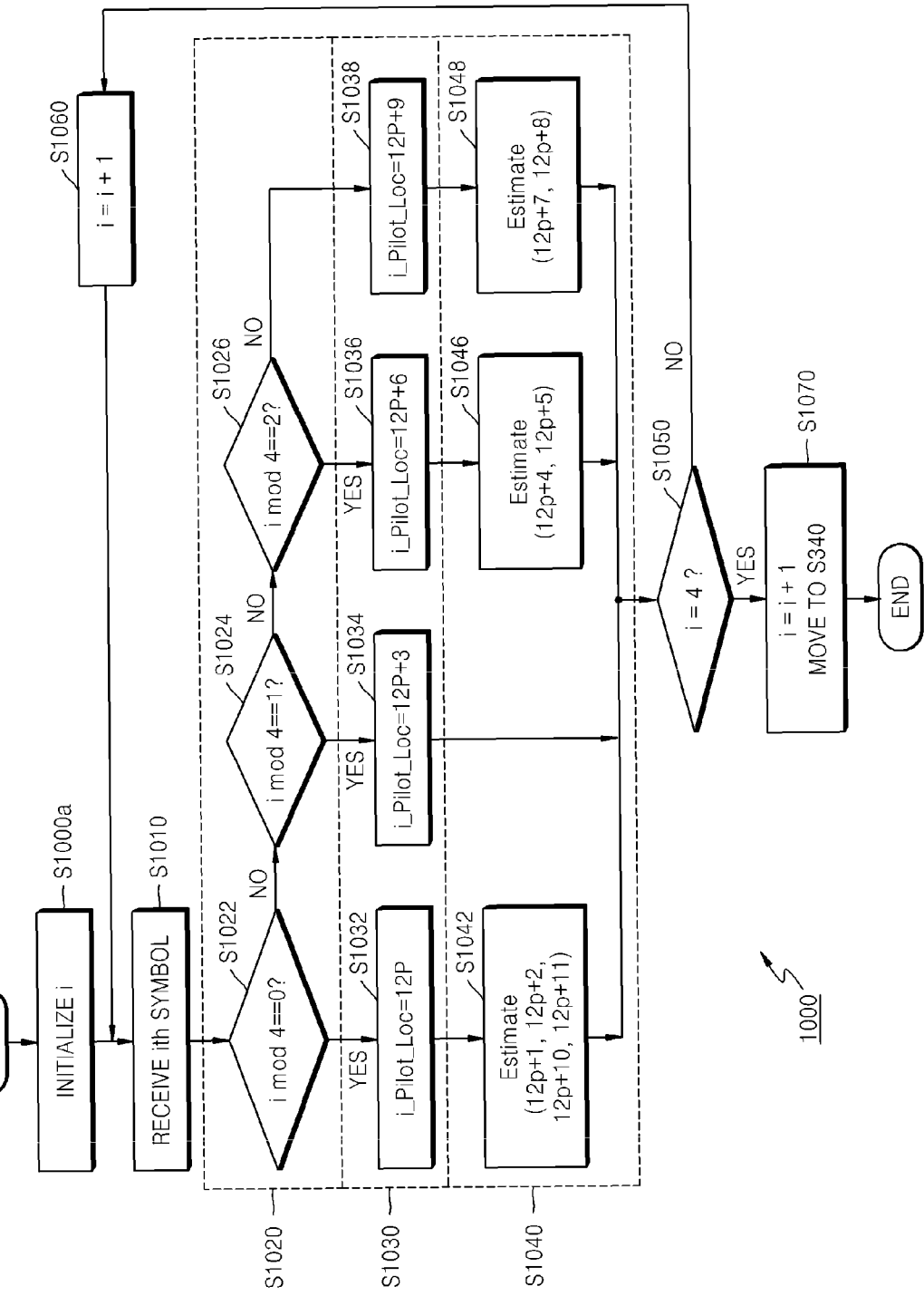
FIGS. 11A and 11B are flowcharts illustrating a channel estimating method.
Figure 11B:
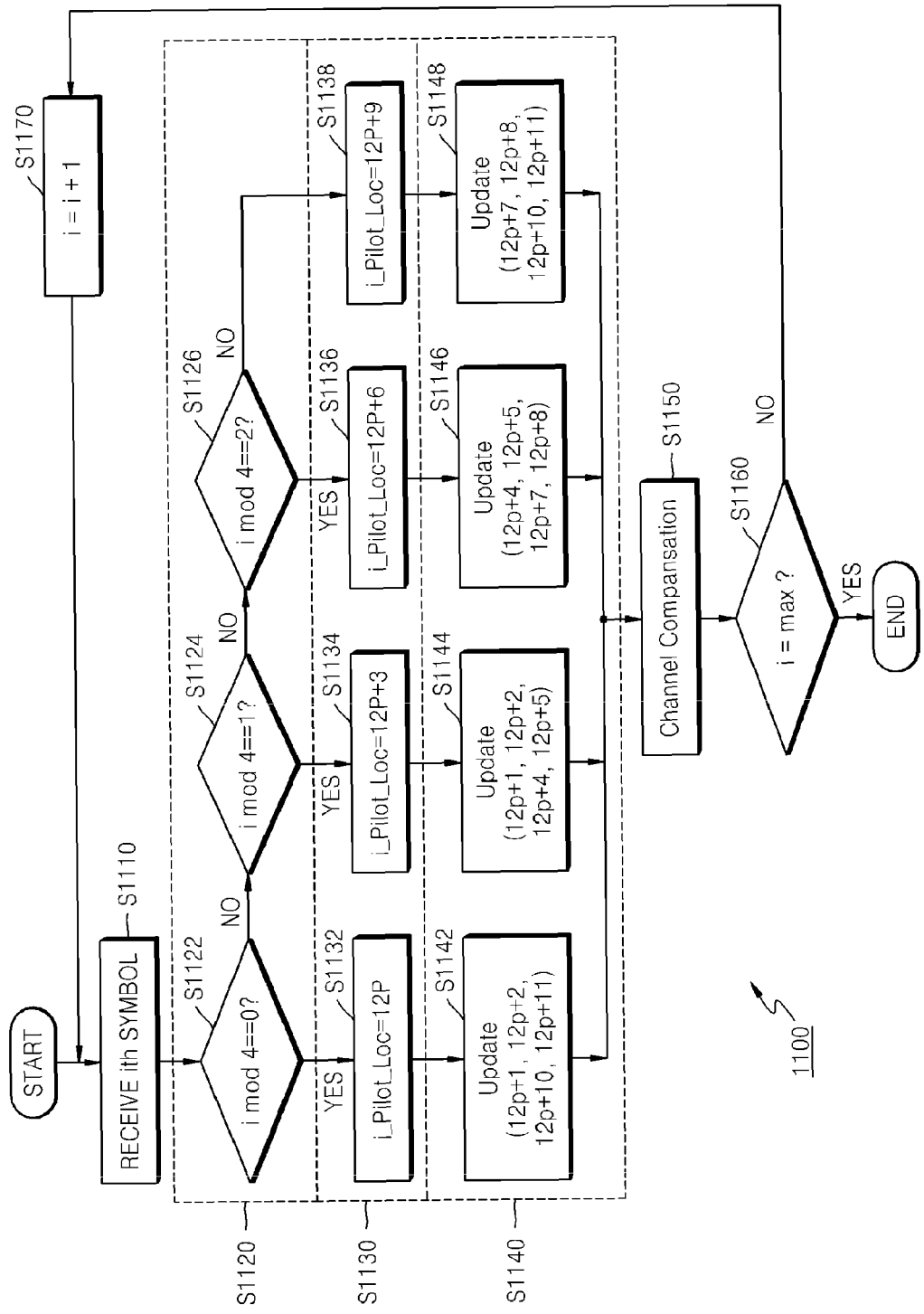

A method of establishing the first and second areas based on k, which is obtained by dividing i by n, estimating data, and updating the data is described further with reference to FIGS. 11A and 11B.

When an operation of establishing the first areas is completed, the control signal transmitting unit 164c of the controller 164 transmits a control signal XCON to the estimation memory 162 so that the pilots of the $i^{th}$ symbol SYMi can be placed in the corresponding first area based on the output of the first area establishing unit 164b. Therefore, the pilots of the $i^{th}$ symbol SYMi are placed in the first area of the estimation memory 162 (S323).

A determination is made on whether i is 1 (S329), and if i is 1, i is increased (S322) and the process of establishing the first area is performed again (repeats S321 and S323). A process of receiving the second symbol and placing pilots of the second symbol in the first area is performed. If i is not 1, the pieces of data of the second area is estimated based on the pilots included in the first area of the estimation memory 162 (S325).

The second area establishing unit 164d of the controller 164 may establish areas between the first areas in which the pilots of the $i^{th}$ symbol SYMi are placed and the first areas in which pilots of an $i\pm1^{st}$ symbol are placed, as the second areas. For example, if i is 3, the first areas in which the pilots of the third symbol are placed may be $7^{th}$, $19^{th}$, $21^{st}$, ... areas of the estimation memory 162; the first areas in which pilots of an $i+1^{st}$ symbol, i.e., the fourth symbol, are placed may be 10th, $22^{nd}$, ... areas of the estimation memory 162; and the first areas in which pilots of an $i-1^{st}$ symbol, i.e., the second symbol, are placed may be $4^{th}$, $16^{th}$, $28^{th}$, ... areas of the estimation memory 162. The first areas adjacent to a $7^{th}$ area of the pilot of the third symbol may be established as $4^{th}$ and $10^{th}$ areas. The second areas may be established as $5^{th}$ and $6^{th}$ areas between $4^{th}$ and $7^{th}$ areas, and $8^{th}$ and $9^{th}$ areas between $7^{th}$ and $10^{th}$ areas of the estimation memory 162. A channel of the pieces of data of the second areas may be estimated based on the pilots stored in the first areas.

The channel interpolating unit 166 may estimate the pieces of data of the second areas. In the case where $i=3^{rd}$, $8^{th}$, $9^{th}$, $11^{th}$, and $12^{th}$, areas of the second areas are estimated after the pilots of the fourth symbol are placed.

When determined that i does not equal to n (S326), i is increased (S322) and the process returns to perform operation S321 again. When i equals n, the process moves to S340 to sequentially update the estimated data of th second areas by symbols after the $n^{th}$ symbol (S328).

When the first areas are established and the pieces of data of the second areas are estimated by repeating operations S329 through S326, the first areas of the estimation memory 162 are established and the pieces of data of the second areas are estimated for all the pilots included in the first through fourth symbols. When i equal to n, the process of establishing the first areas and estimating the pieces of data of the second areas is completed, and the method proceeds to operation S340 (S328).

Figure 7:
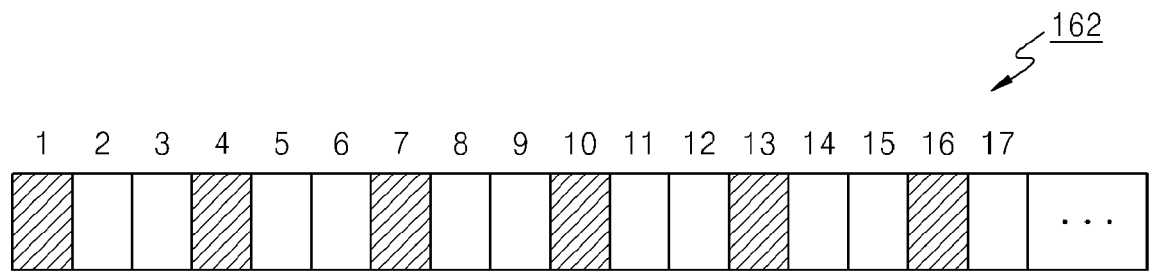
FIG. 7 is a structural view of first and second areas of an estimation memory.

FIG. 7 is a structural view of the first and second areas of the estimation memory 162. The estimation memory 162 is equally divided and corresponds to a symbol. Each divided part represents a pilot or a piece of data included in the symbol. Diagonally lined (hashed) parts of the estimation memory 162 are the first areas (e.g., parts 1, 4, 7, 10, 13, 16, etc.). Parts in-between the first areas (e.g., parts 2, 3, 5, 6, 8, 9, 11, 12, 14, 15, 17, etc.) represent the second areas.

For example, as shown in FIG. 4, if the first areas are calculated based on equation $m*x+z_i$, $1^{st}$, $13^{th}$ ... areas of the estimation memory 162 may be the first areas for the first symbol, and $4^{th}$, $16^{th}$, ... areas of the estimation memory 162 may be the first areas for the second symbol. The empty parts between the first areas of the estimation memory 162 are the second areas.

Figure 8:
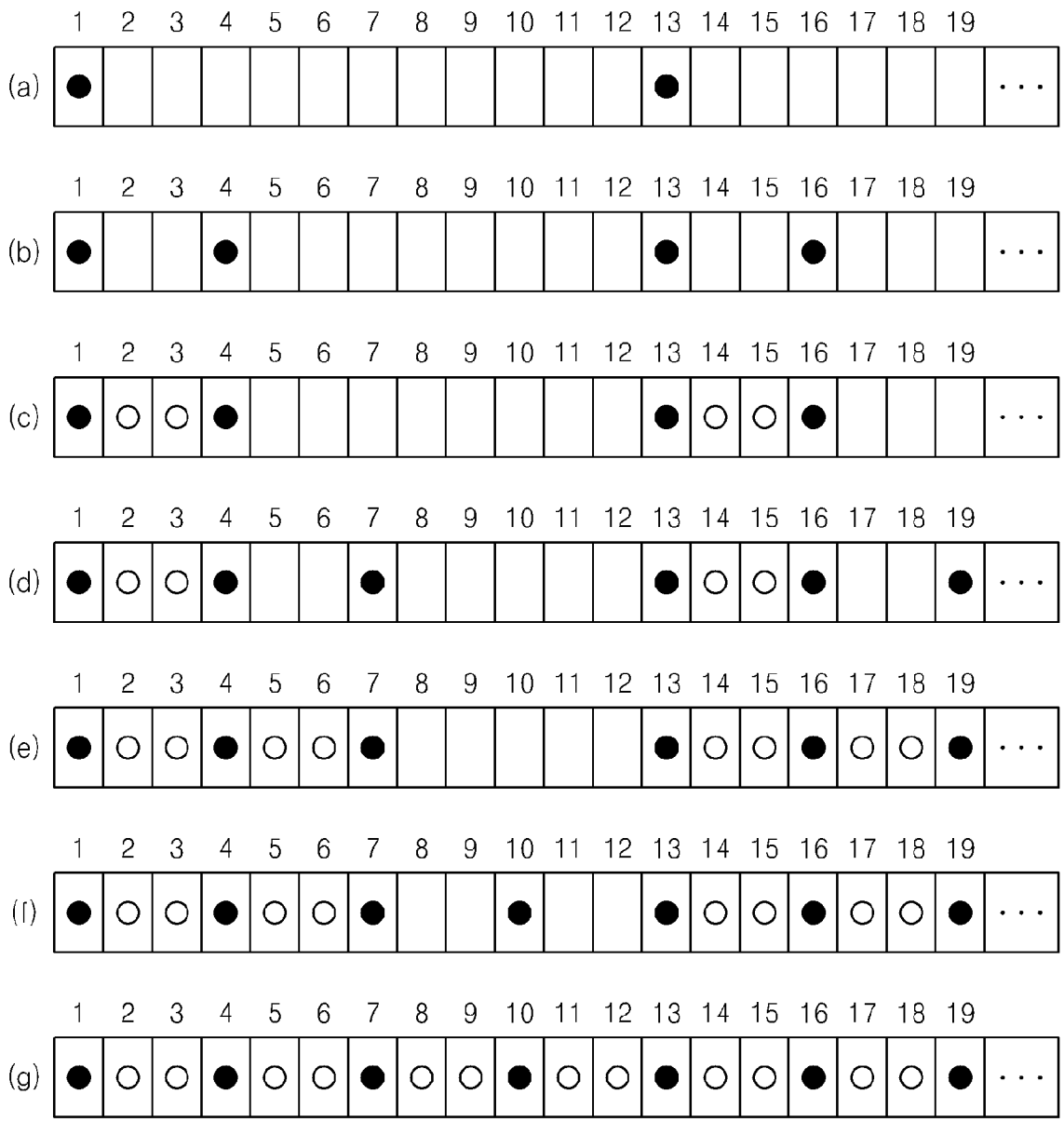
FIG. 8 is a diagram for explaining a channel estimation process according to a data estimation process of the first and second areas shown in FIG. 6 by using the structure of the estimation memory shown in FIG. 7.

FIG. 8 is a diagram for describing an example channel estimation process according to a data estimation process of the first and second areas shown in FIG. 6 by using the structure of the estimation memory 162 shown in FIG. 7. The first row (a) shows pilots of a first symbol placed in $1^{st}$ and $13^{th}$ parts of the first areas of the estimation memory 162 (corresponds to S321 and S323 in FIG. 6). The second row (b) shows that after the pilots of the first symbol are placed in the first areas (as shown in (a)), pilots of a second symbol are placed in the $4^{th}$ and $16^{th}$ parts of the first areas of the estimation memory 162 (corresponds to S321 and S323 in FIG. 6).

The third row (c) shows $2^{nd}$, $3^{rd}$, $14^{th}$, and $15^{th}$ data, i.e., the second areas between the pilots placed in the first areas of the estimation memory 162, are estimated based on the pilots placed in the first areas of the estimation memory 162 (corresponds to S325 in FIG. 6). In this regard, black circles represent the pilots stored in the first areas and white circles represent the estimated data in the second areas. The fourth row (d) shows pilots of a third symbol placed in $7^{th}$ and $19^{th}$ parts of the first areas of the estimation memory 162 (S321 and S323). The fifth row (e) shows $5^{th}$, $6^{th}$, $17^{th}$, and $18^{th}$ data, i.e. the second areas, estimated based on the pilots of the third symbols (corresponds to S325 in FIG. 6). For the sixth row (f), pilots of a fourth symbol are placed in $10^{th}$ and $22^{nd}$ (not shown) parts of the first areas of the estimation memory 162 (corresponds to S321 and S323 in FIG. 6). The seventh row (g) shows $8^{th}$, $9^{th}$, $11^{th}$, and $12^{th}$ data, i.e., the second areas, estimated based on the pilots of the fourth symbol (corresponds to S325 in FIG. 6).

After the process is completed, if i equals to n (YES of S326 in FIG. 6), the channel estimation process with regard to the first through fourth symbols is completed, and a channel update process is performed based on the pilots included in symbols after the $n^{th}$ symbol (S340 or S328 in FIG. 6).

Figure 9:
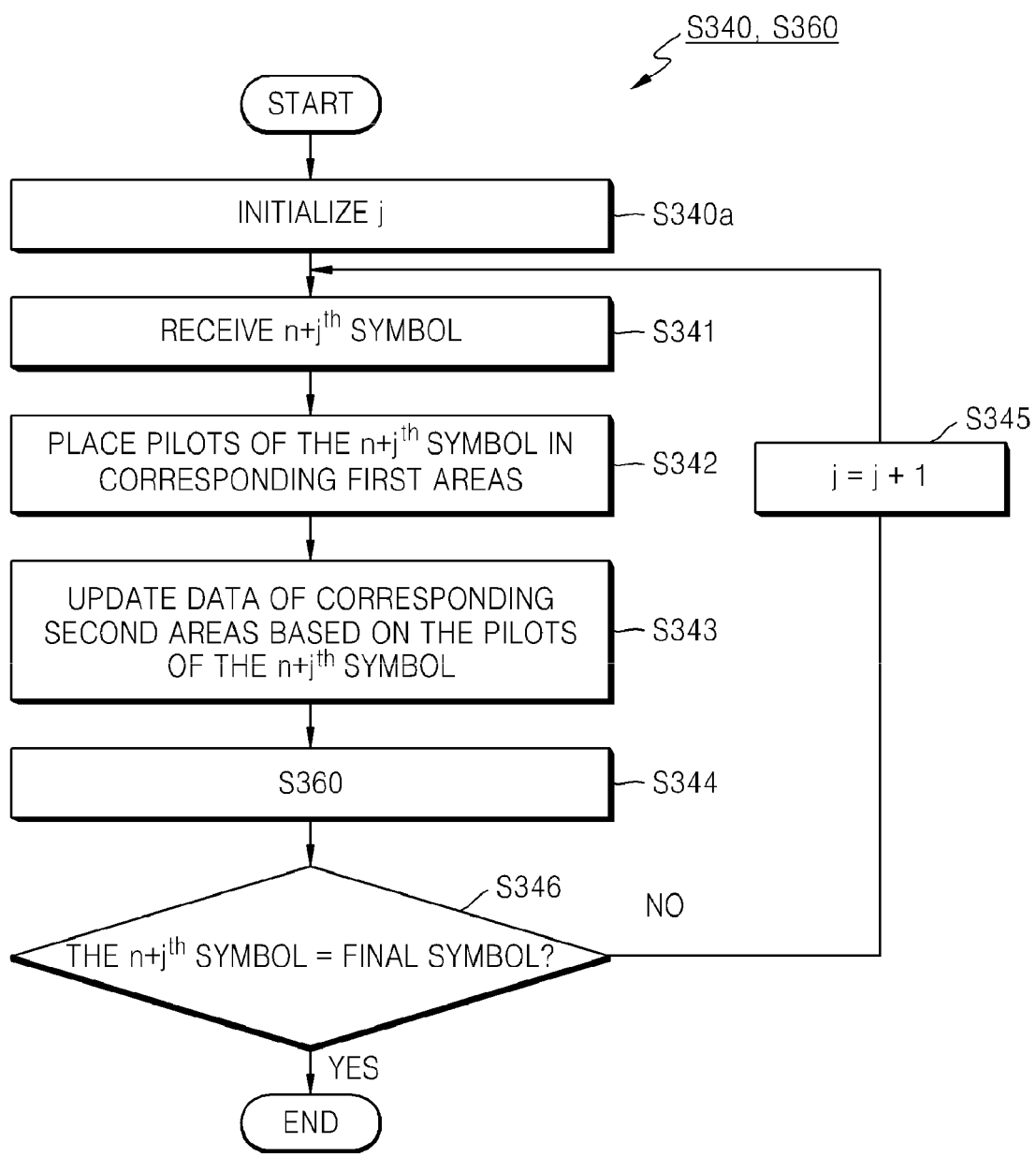
FIG. 9 is a detailed flowchart illustrating a channel updating operation shown in FIG. 5.

FIG. 9 is a detailed flowchart illustrating operation S340 shown in FIG. 2. An initialization variable, j, is initialized as 1 (operation S340a) to indicate the start of the process. The estimated data of the second areas (S340) may be updated by receiving (S341) an arbitrarily selected $n+j^{th}$ (where j is a natural number) symbol, placing (S342) pilots included in the received $n+j^{th}$ symbol in corresponding first areas, and updating (S343) data adjacent to the first areas based on the pilots of the received $n+j^{th}$ symbol placed in the first areas.

Operations S340a through S343 are performed similarly to the controller for estimating the channel and operation S320 shown in FIGS. 3 and 6, respectively. That is, the symbol receiving unit 164a of the controller 164 shown in FIG. 3 receives the $n+j^{th}$ symbol, and the first area establishing unit 164b of the controller 164 establishes the corresponding first areas for the pilots of the received $n+j^{th}$ symbol according to the same process as operation S320.

In this regard, the first areas corresponding to the pilots of the received $n+j^{th}$ symbol may be the same as the first areas in which the pilots of the $i^{th}$ symbol are placed. When a remainder of dividing j by n is i, except where i does not equal 0, the pilots of the $n+j^{th}$ symbol are placed in the same locations as the first areas in which the pilots of the $i^{th}$ symbol are placed. When the remainder equals to 0, the pilots of the $n+j^{th}$ symbol are placed in the same locations as the first areas in which the pilots of an $n^{th}$ symbol are placed. As described above, when n equals to 4, the first areas in which the pilots of the third symbol and the pilots of the seventh symbol are placed may be the same. Thus, placing the pilots of the $n+j^{th}$ symbol in the corresponding first areas may be updating the pilots of the $i^{th}$ symbol.

Likewise, the second areas corresponding to the pilots of the $n+j^{th}$ symbol may be the second areas corresponding to the pilots of the $i^{th}$ symbol, and thus a method of establishing the second areas corresponding to the pilots of the $n+j^{th}$ symbol may be the same as a method of establishing the second areas corresponding to the pilots of the $i^{th}$ symbol.

When the $n+j^{th}$ symbol is not a final symbol (NO of S346), the channel updating process is repeated with regard to a symbol subsequent to the $n+j^{th}$ symbol, i.e. a symbol in which j is increased by 1 (S345). When the $n+j^{th}$ symbol is the final symbol (YES of S346), the channel estimating process is completed. Meanwhile, a channel with regard to the updated data, may be compensated before being compared to the final symbol (S360). However, operation S360 may be performed after operation S346 is performed.

Figure 10:
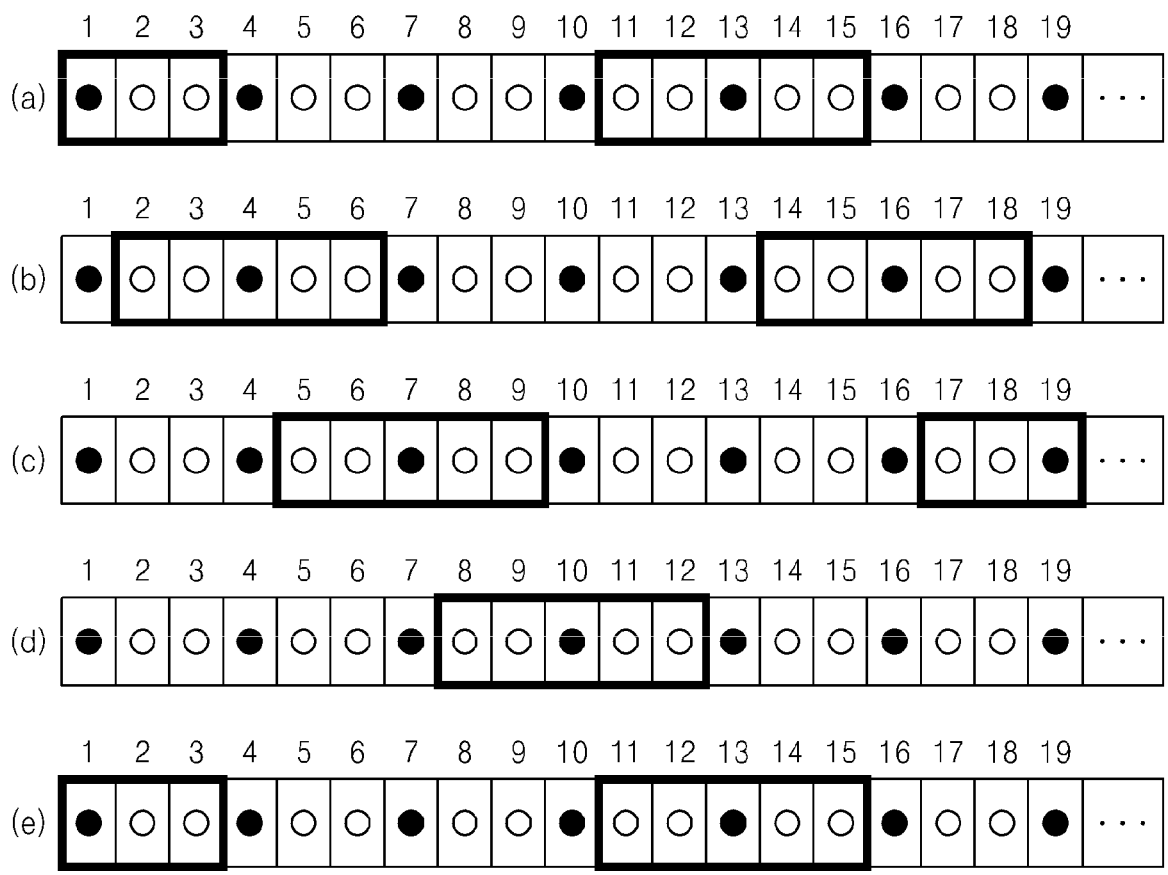
FIG. 10 is a diagram for explaining the channel updating process shown in FIG. 9 by using the structure of the estimation memory shown in FIG. 7.

FIG. 10 is a diagram for explaining the channel updating process shown in FIG. 9 by using the structure of the estimation memory 162 shown in FIG. 7. The first row (a) shows that the pilots included in a fifth symbol are again placed in the first areas ($1^{st}$ and $13^{th}$ parts) of the estimation memory 162. The data of the second areas ($2^{nd}$, $3^{rd}$, $11^{th}$, $12^{th}$, $14^{th}$, $15^{th}$ parts) adjacent to the first areas are updated based on the pilots of the fifth symbol placed in the first areas ($1^{st}$ and $13^{th}$ parts) and the pilots adjacent to the first areas ($4^{th}$, $10^{th}$, and $16^{th}$ parts). In this regard, bold boxes of the estimation memory 162 represent the updated parts.

The second row (b) shows that the pilots included in the sixth symbol are placed in the first areas ($4^{th}$ and $16^{th}$ parts), and data of the second areas are updated based on newly placed pilots of the sixth symbol and pilots adjacent to the newly placed pilots. In this regard, bold boxes of the estimation memory 162 are updated parts.

The third (c) and fourth (d) rows show that the data of the second areas is updated based on the pilots of seventh and eighth symbols similarly to first (a) and second (b) rows. The fifth row (e) shows that a ninth symbol is processed in the same manner as the fifth symbol. Symbols after a tenth symbol are processed in the same manner as the corresponding symbols.

The method 300 and apparatus 160 for estimating the channel of the present specification may be used to perform channel compensation during or after operation S340 with regard to the symbols. That is, although the channel compensation process is performed when the channel updating process is completed in FIG. 2, the present specification is not limited thereto and the channel compensation process may be performed whenever the channel updating operation with regard to each symbol is performed.

FIGS. 11A and 11B are flowcharts illustrating an example channel estimating method. FIG. 11A is a flowchart illustrating a data estimating operation. FIG. 11B is a flowchart illustrating a data updating and channel compensating operations. Various implementations have been described for a general structure of an OFDM symbol, where pilots are inserted in the same locations every four symbols and inserted into each symbol every 11 pieces of data. However, the techniques, systems and apparatus described in this specification are application for other implementations.

Referring to FIG. 11A, an $i^{th}$ symbol is received (S1010) after i is initialized as 1 (S1000a). A remainder is obtained by dividing i by n, e.g. 4 (S1022, S1024, and S1026). Operation S1022 is performed when the remainder is 0; operation S1024 is performed when the remainder is 1; and operation S1026 is performed when the remainder is 2. While FIG. 11A shows S1020, S1024 and S1026 being performed sequentially or in series, these operations S1022, S1024, and S1026 may be performed inversely. Also, S1022, S1024, and S1026 may be performed in parallel.

The example in FIG. 11A shows that the remainder is 0 in a fourth symbol, 1 in a first symbol, 2 in a second symbol, and 3 in a third symbol.

When the received symbol is classified, pilots in the classified symbol are placed in the first areas of an estimation memory (S1032, S1034, S1036, and S1038). For example, pilots of the symbol having a remainder of 0 are placed at memory locations of multiples of 12, i.e. $12^{th}$, $24^{th}$, . . . , areas. Pilots of the symbol having a remainder of 1 are placed at locations where 3 is added to the multiples of 12, i.e., $3^{rd}$, $15^{th}$, $27^{th}$, . . . , areas. Pilots of the symbol having a remainder of 2 are placed at locations where 6 is added to the multiples of 12, i.e. $6^{th}$, $18^{th}$, $30^{th}$, . . . areas. Finally, pilots of the symbol having a remainder of 3 are placed at locations where 9 is added to the multiples of 12, i.e. $9^{th}$, $21^{st}$, $33^{rd}$, . . . areas. Placing the pilots in the first areas is the same as moving the deviant parts shown in FIG. 7 by two on the right side. Such a placement rule may be properly determined according to the structure of the OFDM symbol.

In the structure of the OFDM symbol shown in FIG. 4, the size of the second areas between the first areas according to the multiples of 12 may be established to include two pieces of data. For example, as shown in FIG. 7, the pilots may be placed according to 12 P+1, 12 P+4, 12 P+7, 12 P+10. Alternatively, the pilots may be placed according to 12 P+2, 12 P+5, 12 P+8, and 12 P+11.

An operation of estimating data of the second areas is performed after the first areas are placed (S1042, S1046, and S1048). Operations S1042, S1046, and S1048 are similar to Operation S325 as described with reference to FIG. 6 or 8. An estimation operation is not performed when the first symbol is received, and the operation of estimating the data of the second areas is performed after the second symbol is received. For example, in case of the second symbol, the pilots of the second symbol are placed at locations of multiples of $12+6^{th}$, data of locations of multiples of $12+4^{th}$ and multiples of $12+5^{th}$ between locations of multiples of $12+3^{rd}$ in which the pilots of the first symbol are placed and locations of multiples of $12+6^{th}$ are estimated. In case of the third symbol, data of locations of multiples of $12+7^{th}$ and multiples of $12+8^{th}$ are estimated similarly to the second symbol. In case of the fourth symbol, data of locations of multiples of $12+1^{st}$ and multiples of $12+2^{nd}$ and multiples of $12+10^{th}$ and multiples of $12+11^{th}$ are estimated, so that all the data is completely estimated.

Such an operation proceeds until i equals to 4, i.e. the fourth symbol is received (S1050 and S1060). After all the data is completely estimated, i is increased by 1 and the data updating operation (S340) is performed.

Referring to FIG. 11B, an $i^{th}$ symbol is received (operation S1110). The value of i is determined as 5 due to operation S1070 after the process 1000 is performed. A remainder is obtained by dividing an $i^{th}$ symbol by n, e.g. 4 (S1122, S1124, and S1126). Operation S1122 when the remainder is 0, operation S1124 when the remainder is 1, and operation S1126 when the remainder is 2 are sequentially performed. However, operations S1122, S1124, and S1126 may be performed inversely or in parallel.

The remainder is 0 in $8^{th}$, $12^{th}$ . . . symbols. The remainder is 1 in $5^{th}$, $9^{th}$, . . . symbols. The remainder is 2 in $6^{th}$, $10^{th}$, . . . symbols. The remainder is 3 in $7^{th}$, $11^{th}$, . . . symbols.

If the received symbol is classified, pilots are placed in the first areas of the estimation memory (S1132, S1134, S1136, and S1138). In the same manner as the data estimation operation, the pilots of the symbol having a remainder of 0 are placed at locations of multiples of 12, i.e. $12^{th}$, $24^{th}$, . . . areas. The pilots of the symbol having the remnant of 1 are placed at locations where 3 is added to the multiples of 12, i.e., $3^{rd}$, $15^{th}$, $27^{th}$, . . . areas. The pilots of the symbol having a remainder of 2 are placed at locations where 6 is added to the multiples of 12, i.e. $6^{th}$, $18^{th}$, $30^{th}$, . . . areas. Finally, pilots of the symbol having a remainder of 3 are placed at locations where 9 is added to the multiples of 12, i.e. $9^{th}$, $21^{st}$, $33^{rd}$, . . . areas.

Placing the pilots during the data updating operation may be performed according to another rule if such a placing is the same as placing the pilots in the data estimating operation. For example, if the pilots are placed according to 12 P+1, 12 P+4, 12 P+7, 12 P+10, or 12 P+2, 12 P+5, 12 P+8, and 12 P+11 in the data estimation operation, the pilots may be placed according to the same rule in the data updating operation.

Updating data of the second areas is performed after the first areas are filled (S1142, S1146, and S1148). Operations S1142, S1146, and S1148 are the same as described with reference to FIG. 9 or 10. For example, in view of the locations of multiples of 12, the data placed at locations of multiples of 12+1 and multiples of 12+2 between the first areas of locations of multiples of 12 and the first areas of locations of multiples of 12+3, are updated. Also, the data placed at locations of multiples of 12+10 and multiples of 12+11 between the first areas of locations of multiples of 12 and the first areas of locations of multiples of 12+9, are updated. Similarly, the data of the second area adjacent to the locations of multiples of 12+3, multiples of 12+6, and multiples of 12+9 may be updated.

After the data updating operation is completed, channel compensation is performed based on the updated data (S1150) until a final symbol is received (S1160 and S1170). S1150 may be performed after the data updating operation is completely performed.

The method 300 and apparatus 160 for estimating a channel according to the present specification may be used to estimate the channel in a unit of a single symbol, whereas conventionally the channel is estimated after all symbols are received. That is, the estimation memory 162 of the present invention has the same size as a single symbol. As shown in FIGS. 8 and 10, the channel is estimated in a symbol unit, so that the estimation memory 162 having the same size as the single symbol may estimate the channel. Furthermore, estimating of the channel in the symbol unit may increase the speed of the channel estimation.

The techniques, systems and apparatus for estimating a channel in an OFDM communication system as described in this specification can be used to estimate the channel in a unit of a single symbol, thereby minimizing the size of hardware used to estimate the channel while reducing the time taken to estimate the channel.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A method of estimating a channel in an orthogonal frequency division multiplexing (OFDM) communication system, the method comprising:
   sequentially receiving OFDM modulated symbols, wherein each symbol includes pilots and data;
   placing the pilots included in each of first through $n^{th}$ symbols of the sequentially received symbols in first areas of a memory component used for channel estimation;
   estimating data in second areas disposed between the first areas of the memory component; and
   placing the pilots of at least one symbol after the $n^{th}$ symbol of the sequentially received symbols in the first areas and updating the estimated data in the second areas,
   wherein estimating the data in the second areas comprises:
   when an arbitrary symbol of the first through $n^{th}$ symbols is an $i^{th}$ symbol (where i is a natural number and $1 \leq i \leq n$),
   receiving the $i^{th}$ symbol and placing pilots included in the $i^{th}$ symbol in the first areas; and
   estimating the data in the second areas adjacent to the first areas based on the pilots of the $i^{th}$ symbol placed in the first areas and pilots of a symbol previous to the $i^{th}$ symbol.

2. The method of claim 1, wherein a size of the memory component corresponds to a size of a single symbol.

3. The method of claim 1, wherein estimating and updating the data in the second areas of the memory component comprises performing channel interpolation.

4. The method of claim 3, wherein the performing channel interpolation comprises at least one of linear interpolation, cubic interpolation, lattice interpolation, and interpolation using low pass filter.

5. The method of claim 1, wherein the pilots are found in same locations per every n symbols of the sequentially received symbols,
   estimating the data in the second areas comprises estimating the data based on the pilots included in the first through $n^{th}$ symbols and placed in the first areas, and
   updating the estimated data in the second areas comprises:
   replacing the pilots in the first areas with pilots included in the at least one symbol after the $n^{th}$ symbol and updating the estimated data in the second areas based on the replacement pilots.

6. The method of claim 1, wherein estimating the data in the second areas comprises:
   detecting whether the $i^{th}$ symbol is a first symbol in the sequence of symbols after the pilots are placed in the first areas; and
   detecting whether the $i^{th}$ symbol is the $n^{th}$ symbol in the sequence of symbols after the data in the second areas is estimated,
   wherein when detecting that the $i^{th}$ symbol is the first symbol, receiving $(i+1)^{th}$ symbol and placing pilots included in the $(i+1)^{th}$ symbol in the first areas, and when detecting that the $i^{th}$ symbol is not the first symbol, estimating the data in the second areas, and
   wherein when detecting that the $i^{th}$ symbol is the $n^{th}$ symbol, updating the estimated data in the second areas, and when detecting that the $i^{th}$ symbol is not the $n^{th}$ symbol, receiving $(i+1)^{th}$ symbol and placing pilots of the $(i+1)^{th}$ symbol in the first areas.

7. The method of claim 6, wherein when the pilots are repeatedly located every m−1 pieces of data of the received symbols, (where m is a natural number), and $z_i$ is a location of a first pilot included in the $i^{th}$ symbol, (where $z_i$ is an integer and $0 \leq z_i \leq m-1$), the first areas in which the pilots of the $i^{th}$ symbol are placed are identified as areas $(m*x+z_i)$ of the memory (where x is 0 and a positive integer).

8. The method of claim 5, wherein updating the estimated data of the second areas comprises:
   when an arbitrary symbol among the sequentially received symbols after $n^{th}$ symbol is an $n+j^{th}$ symbol (where j is a natural number),
   initializing j as 1;
   receiving the $n+j^{th}$ symbol;
   placing pilots included in the received $n+j^{th}$ symbol in the first areas; and
   updating the data in the second areas adjacent to the first areas based on the pilots included in the $n+j^{th}$ symbol and pilots included in a symbol previous to the $n+j^{th}$ symbol.

9. The method of claim 8, further comprising: after the data in the second areas is updated,
   compensating for the updated channel; and
   detecting whether the $n+j^{th}$ symbol is a final symbol, and when detecting that the $n+j^{th}$ symbol is not the final symbol, receiving $n+(j+1)^{th}$ symbol, and when detecting that the $n+j^{th}$ symbol is the final symbol, ending channel estimation.

10. The method of claim 9, comprising:
    placing the pilots of the $n+j^{th}$ symbol in the first areas where the pilots included in the $n^{th}$ symbol are placed when a remainder of dividing j by n is 0; and placing the pilots of the n+j$^{th}$ symbol in the first areas where the pilots included in the i$^{th}$ symbol are placed when the remainder of dividing j by n is i.

11. The method of claim 1, wherein estimating the data comprises:
when the pilots are found in the same locations per every n symbols, each symbol including a pilot every m−1 pieces of data, and an arbitrary symbol is an i$^{th}$ symbol (where i is a natural number),
initializing i as 1;
receiving the i$^{th}$ symbol;
calculating a remainder k of dividing i by n (where k is 0 and a positive integer and $0 \leq k \leq n-1$);
placing pilots included in the i$^{th}$ symbol in the first areas of the memory component used for the channel estimation based on the calculated remainder k; and
estimating the data in the second areas adjacent to the first areas in which the pilots of the i$^{th}$ symbol are placed.

12. The method of claim 9, wherein when i is greater than n, updating the data in the second areas, comprising:
receiving the i$^{th}$ symbol;
calculating the remainder k of dividing i by n;
placing the pilots included in the i$^{th}$ symbol in the first areas of the memory component used for the channel estimation based on the calculated remainder k; and
updating the data in the second areas adjacent to the first areas based on the pilots included in the i$^{th}$ symbol and pilots included in a symbol previous to the i$^{th}$ symbol.

13. An apparatus for estimating a channel in an OFDM communication system, the apparatus comprising:
an estimation memory component to store data and pilots used to estimate the channel, wherein the data and the pilots are included in OFDM modulated symbols received from OFDM communication system; and
a controller in communication with the estimation memory component to place pilots included in each of received symbols in first areas of the estimation memory component, and control estimation and update of data in second areas adjacent to the first areas based on the pilots placed in the first areas,
wherein the pilots are found in the same locations per every n symbols of the received symbols, and the pilots for each symbol are located every m−1 pieces of data of each symbol;
when an arbitrary symbol is an i$^{th}$ symbol, the first area establishing unit obtains k as a remainder of dividing i by n;
when $z_i$ is a location of a first one of the pilots in the i$^{th}$ symbol, $z_i$ has a same value if the remainder is the same;
wherein the first area establishing unit establishes (m*x+$z_i$) areas of the estimation memory component as the first areas to place the pilots of the i$^{th}$ symbol; and
wherein x is 0 and a positive integer, m is a natural number, i is a natural number, k is an integer and $0 \leq k \leq n-1$, and $z_i$ is 0 or a positive integer and $0 \leq z_i \leq m-1$.

14. The apparatus of claim 13, wherein a size of the memory component corresponds to a size of a single symbol.

15. The apparatus of claim 13, wherein the controller comprises:
a symbol receiving unit to receive the symbols;
a first area establishing unit to establish areas in which pilots included in the symbols are placed as the first areas of the estimation memory component;
a second area establishing unit to establish areas adjacent to the first areas as the second areas of the estimation memory component; and
a control signal transmitting unit to transmit a control signal to the estimation memory component based on outputs of the first area establishing unit and the second area establishing unit.

16. The apparatus of claim 13, further comprising: a channel interpolating unit in communication with the estimation memory component to estimate and update the channel for the estimated and updated data in the second areas,
wherein the channel interpolating unit estimates the channel for the estimated data in the second areas based on the pilots included in the first through n$^{th}$ symbols and placed in the first areas and updates the channel for the updated data of the second areas based on pilots included in a symbol after the n$^{th}$ symbol and placed in the first areas.

17. The apparatus of claim 16, further comprising: an equalizing unit in communication with the channel interpolating unit to compensate for a channel of the updated data.

18. The apparatus of claim 16, wherein the channel interpolating unit is configured to estimate the channel using at least one of linear interpolation, cubic interpolation, lattice interpolation, and interpolation using low pass filter.

* * * * *